March 26, 1929. W. G. CADY Re. 17,246
METHOD OF MAINTAINING ELECTRIC CURRENTS OF CONSTANT FREQUENCY
Original Filed May 28, 1921
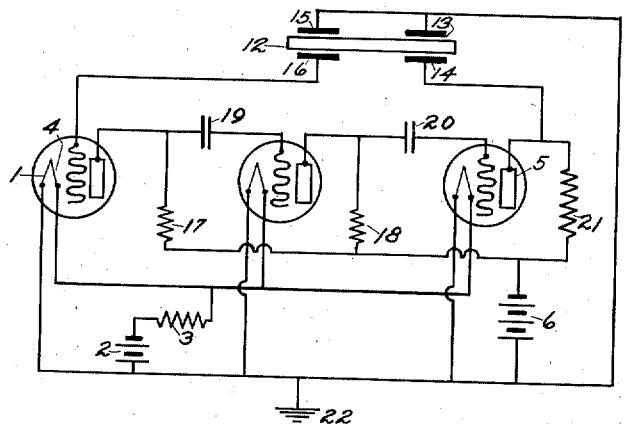
INVENTOR
WALTER G. CADY
by David Rines
ATTORNEY Reissued Mar. 26, 1929. Re. 17,246

UNITED STATES PATENT OFFICE.

WALTER G. CADY, OF MIDDLETOWN, CONNECTICUT, ASSIGNOR TO RADIO CORPORATION OF AMERICA, A CORPORATION OF DELAWARE.

METHOD OF MAINTAINING ELECTRIC CURRENTS OF CONSTANT FREQUENCY.

Original No. 1,472,583, dated October 30, 1923, Serial No. 473,434, filed May 28, 1921. Application for reissue filed August 6, 1925. Serial No. 48,682.

DIVISION B

The invention which forms the subject of my present application for Letters Patent is an improvement in the art of producing and maintaining alternating currents of constant frequency. It is well known that, heretofore, the development of such currents, to any very high degree of precision, has been unattainable by ordinary means and great difficulty has been experienced in producing alternating currents of high and constant frequency and free from fluctuations, due to disturbances in or near the generating system.

The useful applications of my invention are numerous. It may be employed in the transmission or the reception of intelligence by means of high-frequency currents, or it may be used for the testing and measurement of such currents, in all cases where the frequency can be varied, and, in general, the invention is applicable to currents of any frequency.

In an application filed by me on January 28, 1920, Serial No. 354,659, which has matured into Patent No. 1,450,246, April 3, 1923, I have shown and described what I have termed a piezo-electric resonator, which, in general, comprises a plate of piezo-electric crystal with coatings on its opposite faces. The "coatings" may be either thin layers of metal on the crystal itself, or metallic plates in fixed relation to the crystal, or, in general, any means whereby an electric charge may be conducted to the resonator in such a way as to produce an electric field in the proper direction through the crystal. Such a device has a natural period of vibration, but when set in vibration by a source of alternating current connected to its coatings, the amplitude of such vibrations is very slight, unless the frequency of the alternating current approximates or equals the natural frequency of the device, in which case the reaction of the crystal upon the circuit may be very great. In carrying out my present invention, I utilize this piezo-electric resonator in the manner hereinafter to be described.

The special properties of the piezo-electric resonator that I take advantage of for my present purpose are—first: that property by virtue of which such a resonator, whose vibrations are maintained by impulses received from one electric circuit, may be used to transmit energy, in the form of an alternating current, into another circuit; second, that property which it possesses of modifying, by its reactions, the alternating current of a particular frequency or frequencies flowing to it.

In the description and explanations of my invention which follow, I have assumed the piezo-electric resonator to comprise a single, suitably prepared plate cut from a piezo-electric crystal, and provided with conductive coatings, and utilizing the so-called transverse effect; but all statements made apply equally to crystal preparations utilizing the longitudinal effect, and, in general, to any mechanical vibrating system whatever, having suitable preparations of piezo-electric crystals for setting the system into vibration and for utilizing its reactions.

The nature and purpose of the present invention may be most readily comprehended by reference to the single figure of the accompanying drawings, which is a diagram of a three-stage amplification system of well-known type, in which a piezo-electric resonator is employed to maintain constant frequency in accordance with my invention.

In accordance with the principle of operation set forth in my application, Serial No. 21,734, filed April 8, 1925, for reissue of my Letters Patent No. 1,472.583, of which the present application is a division, the piezo-electric resonator may be used with any generator of alternating current, such as a vacuum tube, the frequency of which is capable of being determined by the varying potential difference between two fixed points in the circuit or system of circuits.

The greater the amplification constant of the vacuum tube, the more widely may the electrical constants of the circuit be altered, without affecting the frequency. For this reason, a still greater degree of stability may be attained by the use of a plurality of tubes, connected for cascade amplification. I have found, for instance, that by the use of a cascade amplifier comprising three tubes, the coils and the tuning condenser of the well-known and universally recognized Armstrong oscillating circuit may be entirely dispensed with.

This arrangement of circuits is shown in the accompanying drawing, in which 4 represents the grid of the first tube and 5 the anode of the third. Two resistances 17 and 18 are employed, and two condensers 19 and 20. This illustrates the well known "resistance amplification", but any other type of amplifier might be employed. In this figure, 21 is a resistance or other impedance in the anode or output circuit, while the piezo-electric resonator 12 has its two coatings 14 and 13 connected to the plate 5, and the ground 22, respectively, and its two coatings 15 and 16 connected, the one to the ground 22, and the other to the grid 4.

The operation of this arrangement is as follows: Any slight increase in the potential of the anode 5, by altering the electric field between the plates 13 and 14, sets the piezo-electric resonator in vibration. The charges thereby excited in the coatings 15 and 16 vary the potential of the grid 4 with respect to the ground 22. This varying potential, by virtue of the amplification taking place in the system, will, if the proper coating is connected with the grid 4, still further increase the variations in the potential of the anode 5 and maintain the piezo-electric resonator in vibration. From the resistance or impedance 21, a small amount of output power, at a constant frequency, may be drawn.

Having now described my invention, what I claim is:

1. An oscillating system comprising a plurality of vacuum tubes having an input circuit and an output circuit, the system being normally non-oscillating, and an electro-mechanical vibrator coupling the circuits together and adapted together with the circuits to produce oscillations, the vibrator being adapted to vibrate mechanically when stimulated electrically and to respond electrically when vibrated mechanically and being designed to maintain the frequency of the oscillations substantially constant.

2. An oscillating system comprising a plurality of vacuum tubes having an input circuit and an output circuit, the system being normally non-oscillating, and a piezo-electric body coupling the circuits together and adapted together with the circuits to produce oscillations, the body being designed to maintain the frequency of the oscillations substantially constant.

3. An oscillating system comprising a plurality of vacuum tubes each having a filament, a grid and a plate, the system being normally non-oscillating, and a piezo-electric body connecting one of the grids with one of the plates and adapted together with the tubes to produce oscillations, the body being designed to maintain the frequency of the oscillations substantially constant and being so connected that variations in the potential of the said one plate will be transmitted through the body to the said one grid and from the grid back to the plate, whereby the system is rendered oscillating and at substantially constant frequency.

4. An oscillatory system comprising a plurality of vacuum tubes connected in cascade, and each comprising a filament, a grid and a plate, an electro-mechanical vibrator connecting the grid of one tube with the plate of another tube, the vibrator being adapted to vibrate mechanically when stimulated electrically and to respond electrically when vibrated mechanically.

5. An oscillating system comprising a plurality of vacuum tubes each having a filament, a grid and a plate, the system being normally non-oscillating, and a piezo-electric body connecting one of the grids with one of the filaments and adapted together with the tubes to produce oscillations, the body being designed to maintain the frequency of the oscillations substantially constant and being so connected that variations in the potential of the said one plate will be transmitted through the body to the said one grid and from the grid back to the plate, whereby the system is rendered oscillating and at substantially constant frequency.

In testimony whereof, I hereunto affix my signature.

WALTER G. CADY.